(12) United States Patent
Wang et al.

(10) Patent No.: US 12,150,070 B2
(45) Date of Patent: Nov. 19, 2024

(54) RESOURCE SHARING METHOD AND APPARATUS, TERMINAL, AND NETWORK DEVICE

(71) Applicant: GUANGDONG OPPO MOBILE TELECOMMUNICATIONS CORP., LTD., Guangdong (CN)

(72) Inventors: Shukun Wang, Guangdong (CN); Jinqiang Xing, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 406 days.

(21) Appl. No.: 17/540,248

(22) Filed: Dec. 2, 2021

(65) Prior Publication Data

US 2022/0095245 A1 Mar. 24, 2022

Related U.S. Application Data

(63) Continuation of application No. PCT/CN2019/095573, filed on Jul. 11, 2019.

(51) Int. Cl.
*H04W 52/36* (2009.01)
*H04W 52/14* (2009.01)
*H04W 52/24* (2009.01)
*H04W 76/30* (2018.01)

(52) U.S. Cl.
CPC ....... *H04W 52/367* (2013.01); *H04W 52/146* (2013.01); *H04W 52/243* (2013.01); *H04W 76/30* (2018.02)

(58) Field of Classification Search
CPC ............. H04W 52/367; H04W 52/146; H04W 52/243; H04W 52/265; H04W 76/30; H04W 76/15; H04W 88/06
See application file for complete search history.

(56) References Cited

U.S. PATENT DOCUMENTS

| 2014/0141824 A1* | 5/2014 | Kim | H04W 88/06 455/501 |
| 2014/0287694 A1* | 9/2014 | Kim | H04W 64/00 455/67.11 |
| 2016/0105808 A1* | 4/2016 | Song | H04B 15/00 455/422.1 |

FOREIGN PATENT DOCUMENTS

| CN | 104919711 | 9/2015 |
| CN | 104956596 | 9/2015 |
| CN | 104995989 | 10/2015 |
| WO | 2018063200 | 4/2018 |

(Continued)

OTHER PUBLICATIONS

"International Search Report (Form PCT/ISA/210) of PCT/CN2019/095573", mailed on Apr. 1, 2020, with English translation thereof, pp. 1-10.

(Continued)

*Primary Examiner* — Farid Seyedvosoghi
(74) *Attorney, Agent, or Firm* — JCIP GLOBAL INC.

(57) ABSTRACT

A resource sharing method and apparatus, a terminal, and a network device are provided. The method includes: determining, by the terminal, a first uplink emission power of a first user identification card and a second uplink emission power of a second user identification card, wherein a sum of the first uplink emission power and the second uplink emission power is less than or equal to a maximum uplink emission power of the terminal.

12 Claims, 4 Drawing Sheets

---

A network device receives second indication information transmitted by a terminal, and the second indication information is used to indicate that the terminal has in-device coexistence interference — 301

↓

The network device determines a traffic or a corresponding RRC connection of a released first user identification card or determines a time-division multiplexing pattern, wherein the time-division multiplexing pattern is used to determine an uplink transmission time corresponding to the first user identification card and an uplink transmission time corresponding to a second user identification card, and the uplink transmission time corresponding to the first user identification card and the uplink transmission time corresponding to the second user identification card are time-division multiplexed — 302

(56) References Cited

FOREIGN PATENT DOCUMENTS

WO      2018149576      8/2018

OTHER PUBLICATIONS

"Written Opinion of the International Searching Authority (Form PCT/ISA/237) of PCT/CN2019/095573", mailed on Apr. 1, 2020, with English translation thereof, pp. 1-8.

* cited by examiner

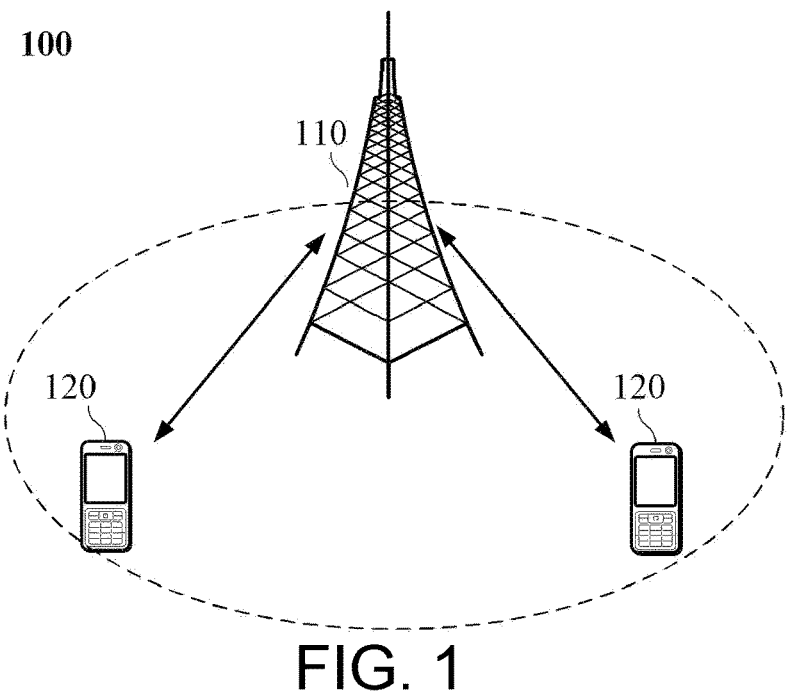

FIG. 1

201 — A terminal determines a first uplink emission power of a first user identification card and a second uplink emission power of a second user identification card, wherein a sum of the first uplink emission power and the second uplink emission power is less than or equal to a maximum uplink emission power of the terminal

FIG. 2

301 — A network device receives second indication information transmitted by a terminal, and the second indication information is used to indicate that the terminal has in-device coexistence interference 302 — The network device determines a traffic or a corresponding RRC connection of a released first user identification card or determines a time-division multiplexing pattern, wherein the time-division multiplexing pattern is used to determine an uplink transmission time corresponding to the first user identification card and an uplink transmission time corresponding to a second user identification card, and the uplink transmission time corresponding to the first user identification card and the uplink transmission time corresponding to the second user identification card are time-division multiplexed

FIG. 3

In a case where a terminal detects in-device coexistence interference, the terminal transmits a first request message or third indication information to a network side, wherein the first request message is used to request the network side to release a traffic or a corresponding RRC connection of a first user identification card, the third indication information is used to indicate a time-division multiplexing pattern, the time-division multiplexing pattern is used to determine an uplink transmission time corresponding to the first user identification card and an uplink transmission time corresponding to a second user identification card, and the uplink transmission time corresponding to the first user identification card and the uplink transmission time corresponding to the second user identification card are time-division multiplexed — 401

FIG. 4

Resource sharing apparatus

Determining circuit 501 — Receiving circuit 503

Transmission circuit 502

FIG. 5

RESOURCE SHARING METHOD AND APPARATUS, TERMINAL, AND NETWORK DEVICE

CROSS-REFERENCE TO RELATED APPLICATION

This application is a continuation of international PCT application serial no. PCT/CN2019/095573, filed on Jul. 11, 2019. The entirety of the above-mentioned patent application is hereby incorporated by reference herein and made a part of this specification.

BACKGROUND

Technical Field

The embodiments of the disclosure relate to the field of mobile communication technology, and specifically relate to a resource sharing method and apparatus, a terminal, and a network device.

Description of Related Art

At present, the capabilities of the terminal generally do not support pure dual communication. Dual communication refers to dual transmission dual reception (dual UL/DL), that is, the terminal performs transmissions of an uplink data traffic and a downlink data traffic on two networks through two user identification cards at the same time. Although the current terminal does not support dual communication, the implementation of dual communication is a future trend of terminal development. However, implementing dual communication in one terminal has the issue of uplink resource sharing allocation and the issue of in-device coexistence interference due to transmission of uplink signals at the same time.

SUMMARY

The embodiments of the disclosure provide a resource sharing method and apparatus, a terminal, and a network device.

A resource sharing method provided by an embodiment of the disclosure includes the following step.

A first uplink emission power of a first user identification card and a second uplink emission power of a second user identification card are determined by a terminal. A sum of the first uplink emission power and the second uplink emission power is less than or equal to a maximum uplink emission power of the terminal.

A resource sharing method provided by an embodiment of the disclosure includes the following steps.

Second indication information transmitted by a terminal is received by a network device. The second indication information is used to indicate that the terminal has in-device coexistence interference.

A traffic or a corresponding radio resource control (RRC) connection of a released first user identification card or a time-division multiplexing pattern is determined by the network device. The time-division multiplexing pattern is used to determine an uplink transmission time corresponding to the first user identification card and an uplink transmission time corresponding to a second user identification card. The uplink transmission time corresponding to the first user identification card and the uplink transmission time corresponding to the second user identification card are time-division multiplexed.

A resource sharing method provided by an embodiment of the disclosure includes the following step.

In a case where a terminal detects in-device coexistence interference, a first request message or third indication information is transmitted by the terminal to a network side. The first request message is used to request the network side to release a traffic or a corresponding RRC connection of a first user identification card. The third indication information is used to indicate a time-division multiplexing pattern. The time-division multiplexing pattern is used to determine an uplink transmission time corresponding to the first user identification card and an uplink transmission time corresponding to a second user identification card. The uplink transmission time corresponding to the first user identification card and the uplink transmission time corresponding to the second user identification card are time-division multiplexed.

A resource sharing apparatus provided by an embodiment of the disclosure includes the following.

A determining circuit is used to determine a first uplink emission power of a first user identification card and a second uplink emission power of a second user identification card. A sum of the first uplink emission power and the second uplink emission power is less than or equal to a maximum uplink emission power of a terminal.

A resource sharing apparatus provided by an embodiment of the disclosure includes the following.

A receiving circuit is used to receive second indication information transmitted by a terminal. The second indication information is used to indicate that the terminal has in-device coexistence interference.

A determining circuit is used to determine a traffic or a corresponding RRC connection of a released first user identification card or determine a time-division multiplexing pattern. The time-division multiplexing pattern is used to determine an uplink transmission time corresponding to a first user identification card and an uplink transmission time corresponding to a second user identification card. The uplink transmission time corresponding to the first user identification card and the uplink transmission time corresponding to the second user identification card are time-division multiplexed.

A resource sharing apparatus provided by an embodiment of the disclosure includes the following.

A transmission circuit is used to transmit a first request message or third indication information to a network side in a case where in-device coexistence interference is detected. The first request message is used to request the network side to release a traffic or a corresponding RRC connection of a first user identification card. The third indication information is used to indicate a time-division multiplexing pattern. The time-division multiplexing pattern is used to determine an uplink transmission time corresponding to the first user identification card and an uplink transmission time corresponding to a second user identification card. The uplink transmission time corresponding to the first user identification card and the uplink transmission time corresponding to the second user identification card are time-division multiplexed.

A terminal provided by an embodiment of the disclosure includes a processor and a memory. The memory is used to store a computer program. The processor is used to call and run the computer program stored in the memory to execute the resource sharing method.

A network device provided by an embodiment of the disclosure includes a processor and a memory. The memory is used to store a computer program. The processor is used to call and run the computer program stored in the memory to execute the resource sharing method.

A chip provided by an embodiment of the disclosure is used to implement the resource sharing method.

Specifically, the chip includes a processor, which is used to call and run a computer program from a memory, so that a device installed with the chip executes the resource sharing method.

A computer-readable storage medium provided by an embodiment of the disclosure is used to store a computer program. The computer program enables a computer to execute the resource sharing method.

A computer program product provided by an embodiment of the disclosure includes a computer program instruction. The computer program instruction enables a computer to execute the resource sharing method.

When a computer program provided by an embodiment of the disclosure is run on a computer, the computer is enabled to execute the resource sharing method.

By adopting the technical solutions of the embodiments of the disclosure, in the scenario of two user identification cards (dual card for short), the dual communication function of the terminal with dual reception dual transmission or dual reception single transmission is implemented. The resource sharing, such as the sharing of the uplink emission powers and the sharing of uplink transmission resources, between the two user identification cards are clear, thereby resolving the issue of in-device coexistence interference, etc.

BRIEF DESCRIPTION OF THE DRAWINGS

The drawings described here are used to provide further understanding of the disclosure and constitute a part of the disclosure. The exemplary embodiments and descriptions thereof of the disclosure are used to explain the disclosure and do not constitute any improper limitation of the disclosure.

FIG. 1 is a schematic diagram of a communication system architecture provided by an embodiment of the disclosure.

FIG. 2 is a first schematic flowchart of a resource sharing method provided by an embodiment of the disclosure.

FIG. 3 is a second schematic flowchart of a resource sharing method provided by an embodiment of the disclosure.

FIG. 4 is a third schematic flowchart of a resource sharing method provided by an embodiment of the disclosure.

FIG. 5 is a first schematic diagram of a structural composition of a resource sharing apparatus provided by an embodiment of the disclosure.

DETAILED DESCRIPTION OF DISCLOSED EMBODIMENTS

Figure 6:
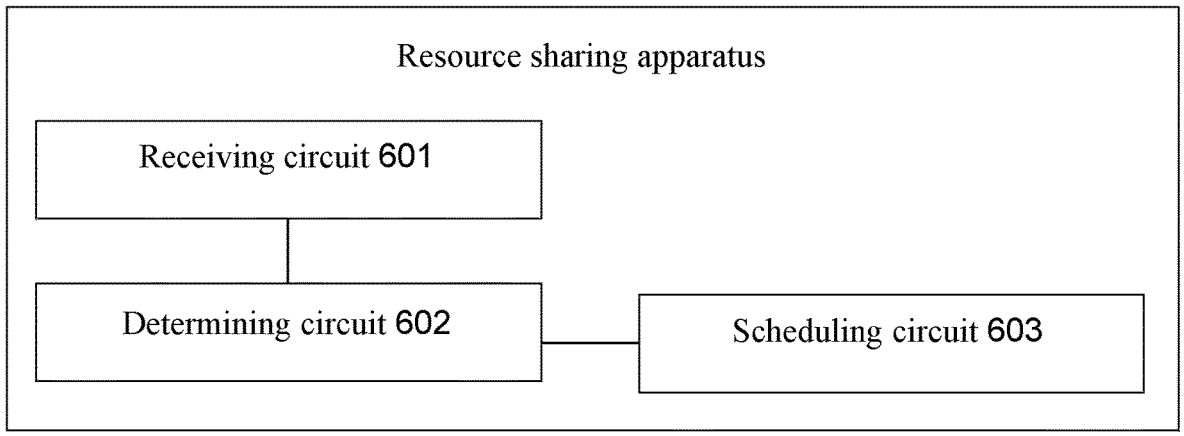
FIG. 6 is a second schematic diagram of a structural composition of a resource sharing apparatus provided by an embodiment of the disclosure.

The technical solutions in the embodiments of the disclosure will be described below in conjunction with the drawings in the embodiments of the disclosure. Obviously, the described embodiments are some but not all embodiments of the disclosure. Based on the embodiments in the disclosure, all other embodiments obtained by persons skilled in the art without creative effort shall fall within the protection scope of the disclosure.

The technical solutions of the embodiments of the disclosure may be applied to various communication systems, such as a global system of mobile communication (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunication system (UMTS), a worldwide interoperability for microwave access (WiMAX) communication system, or a 5G system.

Exemplarily, a communication system 100 applied in the embodiment of the disclosure is shown in FIG. 1. The communication system 100 may include a network device 110. The network device 110 may be a device that communicates with a terminal 120 (also referred to as a communication terminal or a terminal). The network device 110 may provide communication coverage for a specific geographic area and may communicate with a terminal located in the coverage area. Optionally, the network device 110 may be a base station (base transceiver station, BTS) in a GSM system or a CDMA system, a base station (NodeB, NB) in a WCDMA system, an evolutional base station (evolutional Node B, eNB or eNodeB) in an LTE system, or a wireless controller in a cloud radio access network (CRAN), or the network device may be a mobile switching center, a relay station, an access point, an on-board device, a wearable device, a hub, a switch, a bridge, a router, a network-side device in a 5G network, a network device in a future evolutional public land mobile network (PLMN), etc.

The communication system 100 further includes at least one terminal 120 located in the coverage area of the network device 110. As used herein, "terminal" includes but is not limited to connection via a wired route, such as via public switched telephone networks (PSTN), a digital subscriber line (DSL), a digital cable, and a direct cable connection; another data connection/network; via a wireless interface, such as for a cellular network, a wireless local area network (WLAN), a digital television network such as a DVB-H network, a satellite network, and an AM-FM broadcast transmitter; an apparatus of another terminal that is set to receive/transmit a communication signal; and/or an Internet of things (IoT) device. The terminal that is set to communicate through the wireless interface may be referred to as a "wireless communication terminal", a "wireless terminal", or a "mobile terminal". An example of the mobile terminal includes but is not limited to a satellite or cellular phone; a personal communications system (PCS) terminal that may combine cellular radiotelephone with data processing, fax, and data communication capabilities; a PDA that may include a radiotelephone, a pager, an Internet/Intranet access, a Web browser, a notebook, a calendar, and/or a global positioning system (GPS) receiver; and a conventional laptop and/or palmtop receiver or other electronic apparatuses including a radiotelephone transmitter. The terminal may refer to an access terminal, a user equipment (UE), a user unit, a user station, a mobile platform, a mobile station, a remote station, a remote terminal, a mobile device, a user terminal, a terminal, a wireless communication device, a user agent, or a user apparatus. The access terminal may be a cellular phone, a cordless phone, a session initiation protocol (SIP) phone, a wireless local loop (WLL) station, a personal digital assistant (PDA), a handheld device with wireless communication function, a computing device other processing devices connected to a wireless modem, an on-board device, a wearable device, a terminal in a 5G network, a terminal in a future evolutional PLMN, etc.

Optionally, device to device (D2D) communication may be performed between the terminals 120.

Optionally, a 5G system or a 5G network may also be referred to as a new radio (NR) system or an NR network.

FIG. 1 exemplarily shows a network device and two terminals. Optionally, the communication system 100 may include multiple network devices, and the coverage area of each network device may include other numbers of terminals, which are not limited by the embodiment of the disclosure.

Optionally, the communication system 100 may further include other network entities such as a network controller and a mobility management entity, which are not limited by the embodiment of the disclosure.

It should be understood that a device with communication function in a network/system in the embodiment of the disclosure may be referred to as a communication device. Taking the communication system 100 shown in FIG. 1 as an example, the communication device may include the network device 110 with communication function and the terminal 120. The network device 110 and the terminal 120 may be the specific devices described above, which will not be repeated here. The communication device may further include other devices in the communication system 100, such as other network entities such as a network controller and a mobility management entity, which are not limited by the embodiment of the disclosure.

It should be understood that the terms "system" and "network" in the disclosure are often used interchangeably in the disclosure. The term "and/or" in the disclosure is only an association relationship describing associated objects, which represents that there may be three types of relationships. For example, A and/or B may represent three cases: A exists alone, A and B exist at the same time, and B exists alone. In addition, the sign "/" in the disclosure generally represents that the before and after associated objects are in an "or" relationship.

In order to facilitate the understanding of the technical solutions of the embodiments of the disclosure, the technical solutions related to the embodiments of the disclosure are described below.

Dual Card Terminal

Dual card dual standby refers to that one terminal may be installed with two user identification cards at the same time, and the two user identification cards are in the standby state. Dual card dual standby in the market generally refers to dual card dual standby with the same network standard, that is, the GSM network dual card dual standby, the CDMA network dual card dual standby, etc. Dual network dual standby refers to that one terminal may be inserted with two user identification cards with different networks at the same time, and the two user identification cards are in the power-on state at the same time. The user does not need to switch networks to call, answer, and send and receive text messages at will.

At present, the capabilities of the terminal generally do not support pure dual communication. Dual communication refers to dual transmission dual reception (dual UL/DL), that is, a UE performs an uplink data traffic and a downlink data traffic on two networks through two user identification cards at the same time. Generally speaking, most of the current terminals only support single UL/DL or single UL/dual DL, which means that the UE can only execute the traffic on one user identification card at a certain time.

In 5G, one user identification card in dual card may reside in an LTE cell and the other user identification card may reside in an NR cell, or the two user identification cards may both reside in the NR cell. On the other hand, the two user identification cards may belong to the same operator or different operators.

Although the current terminal does not support dual communication, the implementation of dual communication is a future trend of terminal development. However, implementing dual communication in one terminal has the issue of uplink resource sharing allocation and the issue of in-device coexistence interference due to transmission of uplink signals at the same time. As such, the following technical solutions of the embodiments of the disclosure are proposed.

FIG. 2 is a first schematic flowchart of a resource sharing method provided by an embodiment of the disclosure. As shown in FIG. 2, the resource sharing method includes the following steps.

In Step 201, a terminal determines a first uplink emission power of a first user identification card and a second uplink emission power of a second user identification card. A sum of the first uplink emission power and the second uplink emission power is less than or equal to a maximum uplink emission power of the terminal.

In the embodiment of the disclosure, the terminal may be any device capable of network communication at will, such as a mobile phone, a tablet computer, a notebook, an on-board terminal, and a wearable device.

In the embodiment of the disclosure, the terminal supports dual card dual standby. Specifically, the terminal may be inserted with two user identification cards, which are respectively the first user identification card and the second user identification card. A network where the first user identification card and the second user identification card can reside may be the same type of network or different types of networks. For example, the first user identification card may reside in an LTE cell and the second user identification card may reside in an NR cell, or the two user identification cards may both reside in the NR cell.

In the embodiment of the disclosure, the first user identification card and the second user identification card may both be subscriber identification module (SIM) cards or universal subscriber identification module (USIM) cards, or one may be the SIM card and the other one may be the USIM card. The embodiment of the disclosure does not limit the types of the first user identification card and the second user identification card.

It should be noted that the solutions described in the embodiments of the disclosure are all exemplified by dual card, but the disclosure is not limited thereto, and the technical solutions of the embodiments of the disclosure are also applicable to the case of multiple cards in the future. For example, the terminal may be inserted with three user identification cards, which are respectively the first user identification card, the second user identification card, and a third user identification card.

In the embodiment of the disclosure, the terminal supports the communication capability of dual transmission dual reception, that is, the first user identification card and the second user identification card may independently transmit uplink and downlink signals.

In the embodiment of the disclosure, in a case where the two user identification cards transmit uplink signals at the same time, since the terminal has the limitation of the maximum uplink emission power, for example, the maximum uplink emission power is 23 dBm, the two user identification cards need to share a total uplink emission power of the terminal. The following describes how the two user identification cards share the total uplink emission power of the terminal.

In a first manner, the terminal decides a division ratio of the total uplink emission power.

Specifically, the terminal determines the first uplink emission power of the first user identification card and the second uplink emission power of the second user identification card according to a power class of the terminal. The power class of the terminal is used to determine the maximum uplink emission power of the terminal.

In an optional implementation manner, the terminal determines the first uplink emission power of the first user identification card and the second uplink emission power of the second user identification card according to the power class of the terminal and at least one of the following: uplink channel qualities respectively corresponding to the first user identification card and the second user identification card; and traffic quantities respectively corresponding to the first user identification card and the second user identification card.

Here, the power class of the terminal is determined by the terminal according to self-stored information.

Here, the uplink channel quality of the first user identification card may be determined by the terminal according to a detected downlink channel quality of the first user identification card. Similarly, the uplink channel quality of the second user identification card may be determined by the terminal according to a detected downlink channel quality of the second user identification card. It should be noted that according to channel reciprocity, the terminal may infer the corresponding uplink channel quality based on the detected downlink channel quality.

Here, the traffic quantity corresponding to the first user identification card is determined by the terminal according to a traffic quantity to be transmitted on the first user identification card. Similarly, the traffic quantity corresponding to the second user identification card is determined by the terminal according to a traffic quantity to be transmitted on the second user identification card. In an example, the traffic quantity to be transmitted may be indicated through a buffer status report (BSR).

In the embodiment of the disclosure, the terminal may decide the division ratio, and then determine the first uplink emission power of the first user identification card and the second uplink emission power of the second user identification card based on the division ratio. It should be noted that the division ratio refers to a ratio between the first uplink emission power and the second uplink emission power, a ratio of the first uplink emission power to the total uplink emission power (the sum of the first uplink emission power and the second uplink emission power), or a ratio of the second uplink emission power to the total uplink emission power (the sum of the first uplink emission power and the second uplink emission power).

During specific implementation, for the user identification card with better uplink channel quality, less uplink emission power may be allocated, and for the user identification card with poorer uplink channel quality, more uplink emission power may be allocated. For the user identification card with more traffic quantity, more uplink emission power may be allocated, and for the user identification card with less traffic quantity, less uplink emission power may be allocated. It should be noted that the sum of the first uplink emission power and the second uplink emission power cannot exceed the maximum uplink emission power of the terminal.

In an optional implementation manner, the terminal transmits first indication information to a network side. The first indication information is used to indicate the first uplink emission power of the first user identification card and the second uplink emission power of the second user identification card. During the process of uplink power control, the network side may consider the limitation of uplink emission power of the terminal, that is, the division ratio of the total uplink emission power.

It should be noted that the first manner may be applicable to the two following scenarios: the first user identification card and the second user identification card belong to the same operator (intra-mobile network operator, intra-MNO); or the first user identification card and the second user identification card belong to different operators (inter-mobile network operator, inter-MNO).

In a second manner, the network side determines the division ratio of the total uplink emission power.

Specifically, the first uplink emission power of the first user identification card and the second uplink emission power of the second user identification card are determined by the network side according to the power class of the terminal. The terminal receives first configuration information transmitted by the network side. The first configuration information is used to determine the first uplink emission power of the first user identification card and the second uplink emission power of the second user identification card.

In an optional implementation manner, the first uplink emission power of the first user identification card and the second uplink emission power of the second user identification card are determined by the network side according to the power class of the terminal and at least one of the following: the uplink channel qualities respectively corresponding to the first user identification card and the second user identification card; and the traffic quantities respectively corresponding to the first user identification card and the second user identification card.

Here, the power class of the terminal is reported to the network side by the terminal.

Here, the uplink channel quality of the first user identification card may be determined by the network side according to the detected uplink channel quality of the first user identification card. Similarly, the uplink channel quality of the second user identification card may be determined by the network side according to the detected uplink channel quality of the second user identification card.

Here, the traffic quantity corresponding to the first user identification card and the traffic quantity corresponding to the second user identification card are reported to the network side by the terminal. In an example, the traffic quantity may be indicated through the BSR.

In the embodiment of the disclosure, the network side may decide a division ratio, and then determine the first uplink emission power of the first user identification card and the second uplink emission power of the second user identification card based on the division ratio. It should be noted that the division ratio refers to a ratio between the first uplink emission power and the second uplink emission power, a ratio of the first uplink emission power to the total uplink emission power (the sum of the first uplink emission power and the second uplink emission power), or a ratio of the second uplink emission power to the total uplink emission power (the sum of the first uplink emission power and the second uplink emission power).

During specific implementation, for the user identification card with better uplink channel quality, less uplink emission power may be allocated, and for the user identification card with poorer uplink channel quality, more uplink emission power may be allocated. For the user identification card with more traffic quantity, more uplink emission power may be allocated, and for the user identification card with less traffic quantity, less uplink emission power may be allocated. It should be noted that the sum of the first uplink emission power and the second uplink emission power cannot exceed the maximum uplink emission power of the terminal.

It should be noted that the second manner may be applied to the following scenario: the first user identification card and the second user identification card belong to the same operator.

FIG. 3 is a second schematic flowchart of the resource sharing method provided by an embodiment of the disclosure. As shown in FIG. 3, the resource sharing method includes the following steps:

In Step 301, a network device receives second indication information transmitted by a terminal. The second indication information is used to indicate that the terminal has in-device coexistence interference.

In the embodiment of the disclosure, the network device may be a base station, such as a 5G base station (gNB), a 4G base station (eNB), etc.

In the embodiment of the disclosure, the terminal may be any device capable of network communication at will, such as a mobile phone, a tablet computer, a notebook, an on-board terminal, and a wearable device.

In the embodiment of the disclosure, the terminal supports dual card dual standby. Specifically, the terminal may be inserted with two user identification cards, which are respectively the first user identification card and the second user identification card. A network where the first user identification card and the second user identification card can reside may be the same type of network or different types of networks. For example, the first user identification card may reside in an LTE cell and the second user identification card may reside in an NR cell, or the two user identification cards may both reside in the NR cell.

In the embodiment of the disclosure, the first user identification card and the second user identification card may both be SIM cards or USIM cards, or one may be the SIM card and the other one may be the USIM card. The embodiment of the disclosure does not limit the types of the first user identification card and the second user identification card.

It should be noted that the solutions described in the embodiments of the disclosure are all exemplified by dual card, but the disclosure is not limited thereto, and the technical solutions of the embodiments of the disclosure are also applicable to the case of multiple cards in the future. For example, the terminal may be inserted with three user identification cards, which are respectively the first user identification card, the second user identification card, and a third user identification card.

In the embodiment of the disclosure, the terminal may establish an RRC connection with the network side through the first user identification card or may establish an RRC connection with the network side through the second user identification card. The two RRC connections respectively correspond to two networks.

In the embodiment of the disclosure, the terminal supports the communication capability of dual transmission dual reception, that is, the first user identification card and the second user identification card may independently transmit uplink and downlink signals. It can be seen that the uplink signals of the first user identification card and the second user identification card are transmitted through different radio frequency antennas.

The terminal with dual transmission dual reception has the issue of in-device interference coexistence. In a case where the terminal detects in-device coexistence interference, the terminal transmits second indication information to the network device, and the network device receives the second indication information transmitted by the terminal. The second indication information is used to indicate that the terminal has in-device coexistence interference. Further, the network device receives the second indication information transmitted by the terminal through the RRC connection corresponding to the first user identification card or the second user identification card.

In an optional implementation manner, the second indication information is also used to indicate emission source information with in-device coexistence interference. The emission source information with in-device coexistence interference refers to that an uplink transmission corresponding to the first user identification card interferes with an uplink transmission corresponding to the second user identification card or the uplink transmission corresponding to the second user identification card interferes with the uplink transmission corresponding to the first user identification card.

In Step 302, the network device determines a traffic or the corresponding RRC connection of the released first user identification card or determines a time-division multiplexing pattern. The time-division multiplexing pattern is used to determine an uplink transmission time corresponding to the first user identification card and an uplink transmission time corresponding to the second user identification card. The uplink transmission time corresponding to the first user identification card and the uplink transmission time corresponding to the second user identification card are time-division multiplexed.

In the embodiment of the disclosure, the network device determining the traffic or the corresponding RRC connection of the released first user identification card or determining the time-division multiplexing pattern may be implemented through the following manners.

1) The two RRC connections of the two user identification cards respectively correspond to two networks, and the traffic or the RRC connection of which user identification card needs to be released is negotiated by the two networks. Specifically, taking the release of the RRC connection as an example, the two networks are a first network (the RRC connection corresponding to the first user identification card) and a second network (the RRC connection corresponding to the second user identification card). The first network transmits an uplink channel quality and/or a traffic quantity corresponding to the first user identification card to the second network, and the second network compares an uplink channel quality and/or a traffic quantity corresponding to the second user identification card with the uplink channel quality and/or the traffic quantity corresponding to the first user identification card, thereby deciding the RRC connection of which user identification card needs to be released (for example, the RRC connection of the user identification card with poorer quality is released or the RRC connection of the user identification card with less traffic quantity is released).

2) The two RRC connections of the two user identification cards respectively correspond to two networks, and the time-division multiplexing pattern is negotiated by the two networks. Specifically, the two networks are a first network (corresponding to the RRC connection of the first user identification card) and a second network (corresponding to the RRC connection of the second user identification card). The first network decides the time-division multiplexing pattern and notifies the second network of the time-division multiplexing pattern or the second network decides the time-division multiplexing pattern and notifies the first network of the time-division multiplexing pattern.

Based on the time-division multiplexing pattern, the network device schedules the uplink transmission of the first user identification card at the uplink transmission time corresponding to the first user identification card and schedules the uplink transmission of the second user identification card at the uplink transmission time corresponding to the second user identification card. In this way, the uplink transmissions of the two user identification cards do not interfere with each other.

It should be noted that the technical solution of the embodiment of the disclosure is applicable to the following scenario: the first user identification card and the second user identification card belong to the same operator.

In the embodiment of the disclosure, the related technical solution of the time-division multiplexing pattern may not only be applied to a case where the uplink signals of the first user identification card and the second user identification card are transmitted through different radio frequency antennas, but may also be applied to a case where the uplink signals of the first user identification card and the second user identification card are transmitted through the same radio frequency antenna. During specific implementation, if the terminal supports the communication capability of dual reception single transmission, in order to support the function of dual card dual communication, the two user identification cards need to achieve the objective of dual communication through time-sharing transmission for the uplink transmissions. That is, the network device determines the time-division multiplexing pattern. The time-division multiplexing pattern is used to determine the uplink transmission time corresponding to the first user identification card and the uplink transmission time corresponding to the second user identification card. The uplink transmission time corresponding to the first user identification card and the uplink transmission time corresponding to the second user identification card are time-division multiplexed. The first network corresponding to the RRC connection of the first user identification card schedules the uplink transmission of the first user identification card at the uplink transmission time corresponding to the first user identification card, and the second network corresponding to the RRC connection of the second user identification card schedules the uplink transmission of the second user identification card at the uplink transmission time corresponding to the second user identification card.

FIG. 4 is a third schematic flowchart of a resource sharing method provided by an embodiment of the disclosure. As shown in FIG. 4, the resource sharing method includes the following steps.

In Step 401, in a case where a terminal detects in-device coexistence interference, the terminal transmits a first request message or third indication information to a network side. The first request message is used to request the network side to release a traffic or a corresponding RRC connection of a first user identification card. The third indication information is used to indicate a time-division multiplexing pattern. The time-division multiplexing pattern is used to determine an uplink transmission time corresponding to the first user identification card and an uplink transmission time corresponding to a second user identification card. The uplink transmission time corresponding to the first user identification card and the uplink transmission time corresponding to the second user identification card are time-division multiplexed.

In the embodiment of the disclosure, the terminal may be any device capable of network communication at will, such as a mobile phone, a tablet computer, a notebook, an on-board terminal, and a wearable device.

In the embodiment of the disclosure, the terminal supports dual card dual standby. Specifically, the terminal may be inserted with two user identification cards, which are respectively the first user identification card and the second user identification card. A network where the first user identification card and the second user identification card can reside may be the same type of network or different types of networks. For example, the first user identification card may reside in an LTE cell and the second user identification card may reside in an NR cell, or the two user identification cards may both reside in the NR cell.

In the embodiment of the disclosure, the first user identification card and the second user identification card may both be SIM cards or USIM cards, or one may be the SIM card and the other one may be the USIM card. The embodiment of the disclosure does not limit the types of the first user identification card and the second user identification card.

It should be noted that the solutions described in the embodiments of the disclosure are all exemplified by dual card, but the disclosure is not limited thereto, and the technical solutions of the embodiments of the disclosure are also applicable to the case of multiple cards in the future. For example, the terminal may be inserted with three user identification cards, which are respectively the first user identification card, the second user identification card, and a third user identification card.

In the embodiment of the disclosure, the terminal may establish an RRC connection with the network side through the first user identification card or may establish an RRC connection with the network side through the second user identification card. The two RRC connections respectively correspond to two networks.

In the embodiment of the disclosure, the terminal supports the communication capability of dual transmission dual reception, that is, the first user identification card and the second user identification card may independently transmit uplink and downlink signals. It can be seen that the uplink signals of the first user identification card and the second user identification card are transmitted through different radio frequency antennas.

The terminal with dual transmission dual reception has the issue of in-device coexistence interference. In a case where the terminal detects in-device coexistence interference, the terminal transmits a first request message or third indication information to a network device. Further, the terminal transmits the first request message to a network side through the RRC connection corresponding to the first user identification card. The terminal transmits the third indication information to the network side through the RRC connection corresponding to the first user identification card and the RRC connection corresponding to the second user identification card.

In the embodiment of the disclosure, the time-division multiplexing pattern is used by the network side to schedule the uplink transmission of the first user identification card at the uplink transmission time corresponding to the first user identification card and schedule the uplink transmission of the second user identification card at the uplink transmission time corresponding to the second user identification card.

It should be noted that the technical solution of the embodiment of the disclosure is applicable to the two following scenarios: 1) the first user identification card and the second user identification card belong to the same operator; or 2) the first user identification card and the second user identification card belong to different operators.

In the embodiment of the disclosure, the related technical solution of the time-division multiplexing pattern may not only be applied to a case where the uplink signals of the first user identification card and the second user identification card are transmitted through different radio frequency antennas, but may also be applied to a case where the uplink signals of the first user identification card and the second user identification card are transmitted through the same radio frequency antenna. During specific implementation, if the terminal supports the communication capability of dual reception single transmission, in order to support the function of dual card dual communication, the two user identification cards need to achieve the objective of dual communication through time-sharing transmission for the uplink transmissions. That is, the terminal determines the time-division multiplexing pattern. The time-division multiplexing pattern is used to determine the uplink transmission time corresponding to the first user identification card and the uplink transmission time corresponding to the second user identification card. The uplink transmission time corresponding to the first user identification card and the uplink transmission time corresponding to the second user identification card are time-division multiplexed. The terminal configures the time-division multiplexing pattern to a first network and a second network respectively corresponding to the two RRC connections. The first network schedules the uplink transmission of the first user identification card at the uplink transmission time corresponding to the first user identification card. The second network schedules the uplink transmission of the second user identification card at the uplink transmission time corresponding to the second user identification card.

FIG. 5 is a first schematic diagram of a structural composition of a resource sharing apparatus provided by an embodiment of the disclosure. As shown in FIG. 5, the resource sharing apparatus includes the following.

A determining circuit 501 is used to determine a first uplink emission power of a first user identification card and a second uplink emission power of a second user identification card. A sum of the first uplink emission power and the second uplink emission power is less than or equal to a maximum uplink emission power of a terminal.

In an implementation manner, the determining circuit 501 is used to determine the first uplink emission power of the first user identification card and the second uplink emission power of the second user identification card according to a power class of the terminal. The power class of the terminal is used to determine the maximum uplink emission power of the terminal.

In an implementation manner, the determining circuit 501 is used to determine the first uplink emission power of the first user identification card and the second uplink emission power of the second user identification card according to the power class of the terminal and at least one of the following.

Uplink channel qualities respectively corresponding to the first user identification card and the second user identification card.

Traffic quantities respectively corresponding to the first user identification card and the second user identification card.

In an implementation manner, the apparatus further includes the following.

A transmission circuit 502 is used to transmit first indication information to a network side. The first indication information is used to indicate the first uplink emission power of the first user identification card and the second uplink emission power of the second user identification card.

In an implementation manner, the first user identification card and the second user identification card belong to the same operator.

Alternatively, the first user identification card and the second user identification card belong to different operators.

In an implementation manner, the apparatus further includes the following.

A receiving circuit 503 is used to receive first configuration information transmitted by the network side.

The determining circuit 501 is used to determine the first uplink emission power of the first user identification card and the second uplink emission power of the second user identification card based on the first configuration information.

The first uplink emission power of the first user identification card and the second uplink emission power of the second user identification card are determined by the network side according to the power class of the terminal.

In an implementation manner, the first uplink emission power of the first user identification card and the second uplink emission power of the second user identification card are determined by the network side according to the power class of the terminal and at least one of the following.

The uplink channel qualities respectively corresponding to the first user identification card and the second user identification card.

The traffic quantities respectively corresponding to the first user identification card and the second user identification card.

In an implementation manner, the first user identification card and the second user identification card belong to the same operator.

Persons skilled in the art should understand that the relevant description of the resource sharing apparatus of the embodiment of the disclosure may be understood with reference to the relevant description of the resource sharing method of the embodiment of the disclosure.

FIG. 6 is a second schematic diagram of a structural composition of a resource sharing apparatus provided by an embodiment of the disclosure. As shown in FIG. 6, the resource sharing apparatus includes the following.

A receiving circuit 601 is used to receive second indication information transmitted by a terminal. The second indication information is used to indicate that the terminal has in-device coexistence interference.

A determining circuit 602 is used to determine a traffic or a corresponding RRC connection of a released first user identification card or determine a time-division multiplexing pattern. The time-division multiplexing pattern is used to determine an uplink transmission time corresponding to the first user identification card and an uplink transmission time corresponding to a second user identification card. The uplink transmission time corresponding to the first user identification card and the uplink transmission time corresponding to the second user identification card are time-division multiplexed.

In an implementation manner, the second indication information is also used to indicate emission source information with in-device coexistence interference.

The emission source information with in-device coexistence interference refers to that an uplink transmission corresponding to the first user identification card interferes with an uplink transmission corresponding to the second user identification card or the uplink transmission corresponding to the second user identification card interferes with the uplink transmission corresponding to the first user identification card.

In an implementation manner, the receiving circuit 601 is used to receive the second indication information transmitted by the terminal through the RRC connection corresponding to the first user identification card or the second user identification card.

In an implementation manner, the apparatus further includes a scheduling unit 603 used to schedule the uplink transmission of the first user identification card at the uplink transmission time corresponding to the first user identification card and schedule the uplink transmission of the second user identification card at the uplink transmission time corresponding to the second user identification card.

In an implementation manner, the first user identification card and the second user identification card belong to the same operator.

In an implementation manner, uplink signals of the first user identification card and the second user identification card are transmitted through different radio frequency antennas.

In an implementation manner, the uplink signals of the first user identification card and the second user identification card are transmitted through the same radio frequency antenna.

Persons skilled in the art should understand that the relevant description of the resource sharing apparatus of the embodiment of the disclosure may be understood with reference to the relevant description of the resource sharing method of the embodiment of the disclosure.

Figure 7:
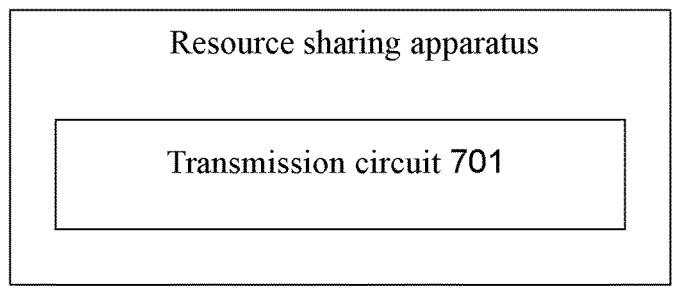
FIG. 7 is a third schematic diagram of a structural composition of a resource sharing apparatus provided by an embodiment of the disclosure.

FIG. 7 is a third schematic diagram of a structural composition of a resource sharing apparatus provided by an embodiment of the disclosure. As shown in FIG. 7, the resource sharing apparatus includes the following.

A transmission circuit 701 is used to transmit a first request message or third indication information to a network side in a case where in-device coexistence interference is detected.

The first request message is used to request the network side to release a traffic or a corresponding RRC connection of a first user identification card. The third indication information is used to indicate a time-division multiplexing pattern. The time-division multiplexing pattern is used to determine an uplink transmission time corresponding to the first user identification card and an uplink transmission time corresponding to a second user identification card. The uplink transmission time corresponding to the first user identification card and the uplink transmission time corresponding to the second user identification card are time-division multiplexed.

In an implementation manner, the transmission circuit 701 is used to transmit the first request message to the network side through the RRC connection corresponding to the first user identification card.

In an implementation manner, the transmission circuit 701 is used to transmit the third indication information to the network side through the RRC connection corresponding to the first user identification card and the RRC connection corresponding to the second user identification card.

In an implementation manner, the time-division multiplexing pattern is used by the network side to schedule an uplink transmission of the first user identification card at the uplink transmission time corresponding to the first user identification card and schedule an uplink transmission of the second user identification card at the uplink transmission time corresponding to the second user identification card.

In an implementation manner, the first user identification card and the second user identification card belong to the same operator.

Alternatively, the first user identification card and the second user identification card belong to different operators.

In an implementation manner, uplink signals of the first user identification card and the second user identification card are transmitted through different radio frequency antennas.

In an implementation manner, the uplink signals of the first user identification card and the second user identification card are transmitted through the same radio frequency antenna.

Persons skilled in the art should understand that the relevant description of the resource sharing apparatus of the embodiment of the disclosure may be understood with reference to the relevant description of the resource sharing method of the embodiment of the disclosure.

Figure 8:
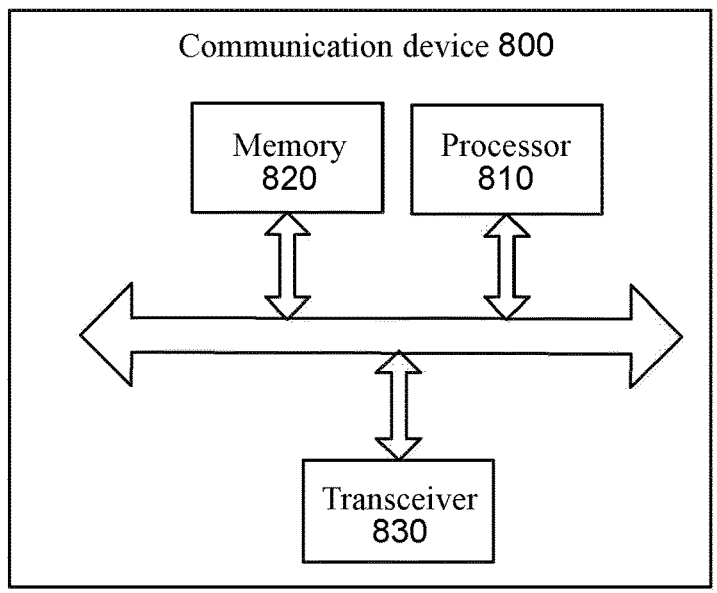
FIG. 8 is a schematic structural diagram of a communication device provided by an embodiment of the disclosure.

FIG. 8 is a schematic structural diagram of a communication device 800 provided by an embodiment of the disclosure. The communication device may be a terminal or a network device. The communication device 800 shown in FIG. 8 includes a processor 810. The processor 810 may call and run a computer program from a memory to implement the method in the embodiment of the disclosure.

Optionally, as shown in FIG. 8, the communication device 800 may further include a memory 820. The processor 810 may call and run the computer program from the memory 820 to implement the method in the embodiment of the disclosure.

The memory 820 may be a separate device independent of the processor 810 or may be integrated in the processor 810.

Optionally, as shown in FIG. 8, the communication device 800 may further include a transceiver 830. The processor 810 may control the transceiver 830 to communicate with other devices, specifically, to transmit information or data to other devices or receive information or data transmitted by other devices.

The transceiver 830 may include a transmitter and a receiver. The transceiver 830 may further include an antenna. The number of the antenna may be one or more.

Optionally, the communication device 800 may specifically be the network device of the embodiment of the disclosure, and the communication device 800 may implement the corresponding process implemented by the network device in each method of the embodiment of the disclosure, which will not be repeated here for the sake of brevity.

Optionally, the communication device 800 may specifically be the mobile terminal/terminal of the embodiment of the disclosure, and the communication device 800 may implement the corresponding process implemented by the mobile terminal/terminal in each method of the embodiment of the disclosure, which will not be repeated here for the sake of brevity.

Figure 9:
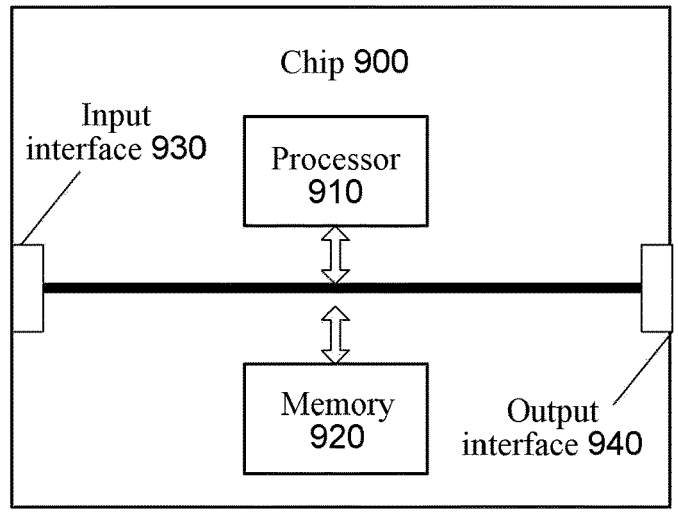
FIG. 9 is a schematic structural diagram of a chip of an embodiment of the disclosure.

FIG. 9 is a schematic structural diagram of a chip of an embodiment of the disclosure. A chip 900 shown in FIG. 9 includes a processor 910. The processor 910 may call and run a computer program from a memory to implement the method in the embodiment of the disclosure.

Optionally, as shown in FIG. 9, the chip 900 may further include a memory 920. The processor 910 may call and run a computer program from the memory 920 to implement the method in the embodiment of the disclosure.

The memory 920 may be a separate device independent of the processor 910 or may be integrated in the processor 910.

Optionally, the chip 900 may further include an input interface 930. The processor 910 may control the input interface 930 to communicate with other devices or chips, specifically, to obtain information or data transmitted by other devices or chips.

Optionally, the chip 900 may further include an output interface 940. The processor 910 may control the output interface 940 to communicate with other devices or chips, specifically, to output information or data to other devices or chips.

Optionally, the chip may be applied to the network device in the embodiment of the disclosure, and the chip may implement the corresponding process implemented by the network device in each method of the embodiment of the disclosure, which will not be repeated here for the sake of brevity.

Optionally, the chip may be applied to the mobile terminal/terminal in the embodiment of the disclosure, and the chip may implement the corresponding process implemented by the mobile terminal/terminal in each method of the embodiment of the disclosure, which will not be repeated here for the sake of brevity.

It should be understood that the chip mentioned in the embodiment of the disclosure may also be referred to as a system-level chip, a system chip, a chip system, a system-on-chip chip, etc.

Figure 10:
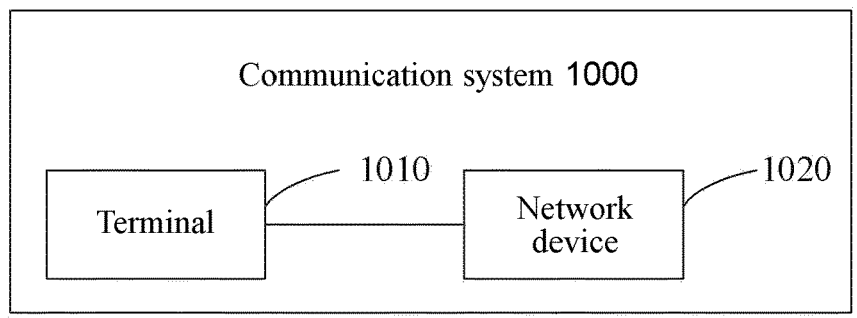
FIG. 10 is a schematic block diagram of a communication system provided by an embodiment of the disclosure.

FIG. 10 is a schematic block diagram of a communication system 1000 provided by an embodiment of the disclosure. As shown in FIG. 10, the communication system 1000 includes a terminal 1010 and a network device 1020.

The terminal 1010 may be used to implement the corresponding function implemented by the terminal in the foregoing method, and the network device 1020 may be used to implement the corresponding function implemented by the network device in the foregoing method, which will not be repeated here for the sake of brevity.

It should be understood that the processor in the embodiment of the disclosure may be an integrated circuit chip, which has signal processing capability. During an implementation process, each step of the embodiment of the foregoing method may be completed by a hardware integrated logic circuit or an instruction in the form of software in the processor. The processor may be a general-purpose processor, a digital signal processor (DSP), an application specific integrated circuit (ASIC), a field programmable gate array (FPGA), or other programmable logic devices, discrete gate or transistor logic devices, or discrete hardware components that may implement or execute each method, step, and logical block diagram disclosed in the embodiment of the disclosure. The general-purpose processor may be a microprocessor or the processor may also be any conventional processor, etc. The steps of the method disclosed in the embodiment of the disclosure may be directly embodied as being executed and completed by a hardware decoding processor or executed and completed by a combination of hardware and software modules in the decoding processor. The software module may be located in a mature storage medium in the art such as a random memory, a flash memory, a read-only memory, a programmable read-only memory, an electrically erasable programmable memory, or a register.

The storage medium is located in the memory. The processor reads information in the memory to complete the steps of the foregoing method in combination with the hardware thereof.

It may be understood that the memory in the embodiment of the disclosure may be a volatile memory or a non-volatile memory or may include both volatile and non-volatile memories. The non-volatile memory may be a read-only memory (ROM), a programmable ROM (PROM), an erasable PROM (EPROM), an electrically EPROM (EEPROM), or a flash memory. The volatile memory may be a random access memory (RAM), which is used as an external cache. Through exemplary but not limiting description, many forms of RAMs may be used, such as a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DR RAM). It should be noted that the memory of the system and the method described herein is intended to include but not limited to these and any other suitable types of memories.

It should be understood that the memory is exemplary but not limiting. For example, the memory in the embodiment of the disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct rambus RAM (DR RAM), etc. In other words, the memory in the embodiment of the disclosure is intended to include but not limited to these and any other suitable types of memories.

The embodiment of the disclosure also provides a computer-readable storage medium used to store a computer program.

Optionally, the computer-readable storage medium may be applied to the network device in the embodiment of the disclosure, and the computer program enables a computer to execute the corresponding process implemented by the network device in each method of the embodiment of the disclosure, which will not be repeated here for the sake of brevity.

Optionally, the computer-readable storage medium may be applied to the mobile terminal/terminal in the embodiment of the disclosure, and the computer program enables the computer to execute the corresponding process implemented by the mobile terminal/terminal in each method of the embodiment of the disclosure, which will not be repeated here for the sake of brevity.

The embodiment of the disclosure also provides a computer program product including a computer program instruction.

Optionally, the computer program product may be applied to the network device in the embodiment of the disclosure, and the computer program instruction enables a computer to execute the corresponding process implemented by the network device in each method of the embodiment of the disclosure, which will not be repeated here for the sake of brevity.

Optionally, the computer program product may be applied to the mobile terminal/terminal in the embodiment of the disclosure, and the computer program instruction enables the computer to execute the corresponding process implemented by the mobile terminal/terminal in each method of the embodiment of the disclosure, which will not be repeated here for the sake of brevity.

The embodiment of the disclosure also provides a computer program.

Optionally, the computer program may be applied to the network device in the embodiment of the disclosure. When the computer program is run on a computer, the computer is enabled to execute the corresponding process implemented by the network device in each method of the embodiment of the disclosure, which will not be repeated here for the sake of brevity.

Optionally, the computer program may be applied to the mobile terminal/terminal in the embodiment of the disclosure. When the computer program is run on the computer, the computer is enabled to execute the corresponding process implemented by the mobile terminal/terminal in each method of the embodiment of the disclosure, which will not be repeated here for the sake of brevity.

Persons skilled in the art may be aware that the units and algorithm steps of each example described in combination with the embodiments disclosed herein may be implemented by electronic hardware or a combination of computer software and electronic hardware. Whether the functions are executed by hardware or software depends on the specific disclosure and design constraint conditions of the technical solution. Professional technicians may use different methods for each specific application to implement the described functions, but such implementation should not be considered beyond the scope of the disclosure.

Persons skilled in the art may clearly understand that for the convenience and brevity of description, for the specific working process of the foregoing system, device, and unit, reference may be made to the corresponding process in the embodiment of the foregoing method, which will not be repeated here.

In the several embodiments provided in the disclosure, it should be understood that the disclosed system, apparatus, and method may be implemented by other manners. For example, the embodiment of the apparatus described above is only illustrative. For example, the division of the units is only a logical function division, and there may be other division manners during actual implementation. For example, multiple units or components may be combined or may be integrated into another system, or some features may be ignored or not implemented. In addition, the displayed or discussed mutual coupling, direct coupling, or communication connection may be indirect coupling or communication connection through some interfaces, apparatuses, or units, or may be electrical, mechanical, or in other forms.

The units described as separate components may or may not be physically separated. The components displayed as units may or may not be physical units, that is, may be located in one place or may be distributed on multiple network units. Some or all of the units may be selected according to actual requirements to achieve the objectives of the solutions of the embodiments.

In addition, the functional units in each embodiment of the disclosure may be integrated in a processing unit, each unit may physically exist alone, or two or more units may be integrated in a unit.

If the function is implemented in the form of a software functional unit and is sold or used as an independent product, the function may be stored in a computer-readable storage medium. Based on such understanding, the essence of the technical solution of the disclosure, the part that contributes to the existing technology, or a part of the technical solution may be embodied in the form of a software product. The computer software product is stored in a storage medium, which includes several instructions for a computer device (which may be a personal computer, a server, a network device, etc.) to execute all or a part of the steps of the method described in each embodiment of the disclosure. The storage medium includes a U disk, a mobile hard disk, a read-only memory (ROM), a random access memory (RAM), a magnetic disk, an optical disk, or other media that may store program codes.

The above are only specific implementation manners of the disclosure, but the protection scope of the disclosure is not limited thereto. Persons skilled in the art may easily conceive changes or substitutions within the technical scope disclosed in the disclosure, which should all be covered within the protection scope of the disclosure. Therefore, the protection scope of the disclosure shall be defined by the protection scope of the claims.

What is claimed is:

1. A resource sharing method, comprising:
receiving, by a network device, indication information transmitted by a terminal, wherein the indication information is used to indicate that the terminal has in-device coexistence interference;
determining, by the network device, a traffic or a corresponding radio resource control (RRC) connection of a released first user identification card or determining a time-division multiplexing pattern, wherein the time-division multiplexing pattern is used to determine an uplink transmission time corresponding to the first user identification card and an uplink transmission time corresponding to a second user identification card, wherein the uplink transmission time corresponding to the first user identification card and the uplink transmission time corresponding to the second user identification card are time-division multiplexed.

2. The method according to claim 1, wherein the indication information is also used to indicate emission source information with the in-device coexistence interference;
the emission source information with the in-device coexistence interference refers to that an uplink transmission corresponding to the first user identification card interferes with an uplink transmission corresponding to the second user identification card or the uplink transmission corresponding to the second user identification card interferes with the uplink transmission corresponding to the first user identification card.

3. The method according to claim 1, wherein receiving, by the network device, the indication information transmitted by the terminal comprises:
receiving, by the network device, the indication information transmitted by the terminal through an RRC connection corresponding to the first user identification card or the second user identification card.

4. The method according to claim 1, further comprising:
scheduling, by the network device, the uplink transmission of the first user identification card at the uplink transmission time corresponding to the first user identification card and scheduling the uplink transmission of the second user identification card at the uplink transmission time corresponding to the second user identification card.

5. The method according to claim 1, wherein uplink signals of the first user identification card and the second user identification card are transmitted through different radio frequency antennas.

6. The method according to claim 1, wherein uplink signals of the first user identification card and the second user identification card are transmitted through a same radio frequency antenna.

7. A resource sharing method, comprising:

transmitting, by a terminal, a first request message or indication information to a network side in a case where the terminal detects in-device coexistence interference, wherein the first request message is used to request the network side to release a traffic or a corresponding RRC connection of a first user identification card, the indication information is used to indicate a time-division multiplexing pattern, and the time-division multiplexing pattern is used to determine an uplink transmission time corresponding to the first user identification card and an uplink transmission time corresponding to a second user identification card, wherein the uplink transmission time corresponding to the first user identification card and the uplink transmission time corresponding to the second user identification card are time-division multiplexed.

8. The method according to claim 7, wherein transmitting, by the terminal, the first request message to the network side comprises:

transmitting, by the terminal, the first request message to the network side through the RRC connection corresponding to the first user identification card.

9. The method according to claim 7, wherein transmitting, by the terminal, the indication information to the network side comprises:

transmitting, by the terminal, the indication information to the network side through the RRC connection corresponding to the first user identification card and the RRC connection corresponding to the second user identification card.

10. The method according to claim 7, wherein the time-division multiplexing pattern is used by the network side to schedule an uplink transmission of the first user identification card at the uplink transmission time corresponding to the first user identification card and schedule an uplink transmission of the second user identification card at the uplink transmission time corresponding to the second user identification card.

11. The method according to claim 7, wherein uplink signals of the first user identification card and the second user identification card are transmitted through different radio frequency antennas.

12. The method according to claim 7, wherein uplink signals of the first user identification card and the second user identification card are transmitted through a same radio frequency antenna.

* * * * *